United States Patent
Mizuno

(10) Patent No.: US 8,320,703 B2
(45) Date of Patent: Nov. 27, 2012

(54) IMAGE PROCESSING METHOD AND APPARATUS

(75) Inventor: Hiroyuki Mizuno, Fukuoka (JP)

(73) Assignee: Sony Corporation, Tokyo (JP)

( * ) Notice: Subject to any disclaimer, the term of this patent is extended or adjusted under 35 U.S.C. 154(b) by 1038 days.

(21) Appl. No.: 11/945,729

(22) Filed: Nov. 27, 2007

(65) Prior Publication Data

US 2008/0137980 A1 Jun. 12, 2008

(30) Foreign Application Priority Data

Dec. 6, 2006 (JP) ................. 2006-329567

(51) Int. Cl.
*G06K 9/40* (2006.01)
(52) U.S. Cl. ........ 382/275; 382/312; 382/300; 382/260; 348/252; 348/199; 348/806
(58) Field of Classification Search .......... 382/275, 382/312, 300, 260; 348/252, 199, 806
See application file for complete search history.

(56) References Cited

U.S. PATENT DOCUMENTS

| | | | | |
|---|---|---|---|---|
| 3,743,766 A | * | 7/1973 | Loose et al. | 348/253 |
| 3,946,152 A | * | 3/1976 | Illetschko et al. | 348/625 |
| 4,672,464 A | * | 6/1987 | Shida | 358/451 |
| 5,057,923 A | * | 10/1991 | Matsuda | 348/240.2 |
| 5,343,243 A | * | 8/1994 | Maeda | 348/222.1 |
| 5,818,527 A | * | 10/1998 | Yamaguchi et al. | 348/335 |
| 6,243,131 B1 | * | 6/2001 | Martin | 348/36 |
| 6,618,081 B1 | * | 9/2003 | Harada et al. | 348/231.6 |
| 7,602,425 B2 | * | 10/2009 | Ishii | 348/240.1 |
| 2004/0174444 A1 | * | 9/2004 | Ishii | 348/240.1 |
| 2004/0189831 A1 | * | 9/2004 | Shibatani et al. | 348/240.99 |
| 2005/0195295 A1 | * | 9/2005 | Kawai | 348/239 |
| 2006/0274170 A1 | * | 12/2006 | Azuma | 348/246 |

FOREIGN PATENT DOCUMENTS

| | | | |
|---|---|---|---|
| JP | 2002-369071 | | 12/2002 |
| JP | 2004-242125 | | 8/2004 |
| JP | 2004242125 | * | 8/2004 |
| JP | 2005-057605 | | 3/2005 |
| JP | 20044242125 | * | 8/2012 |

OTHER PUBLICATIONS

A New approach - - - Estimation., K. Vijayan Asari., IEEE, 0278-0062, 1999, pp. 345-354.*
A new - - - estimation,Asari et al., IEEE, 0278-0062, 1999, pp. 345-354.*
An office action from the Japanese Patent Office for corresponding Japanese Patent document 2006-329567 issued Nov. 18, 2008.

* cited by examiner

*Primary Examiner* — Jayesh A Patel
(74) *Attorney, Agent, or Firm* — SNR Denton US LLP

(57) ABSTRACT

An image processing method executes image processing to correct a non-uniform perceived resolution caused by image distortion correction, thereby achieving a uniform perceived resolution over an entire displayed image. The image processing method includes the step of adjusting an aperture compensation signal using distortion correcting data to correct a non-uniform perceived resolution caused in an image through partial conversion of magnification ratio by image distortion correction, thereby achieving a uniform perceived resolution.

3 Claims, 13 Drawing Sheets

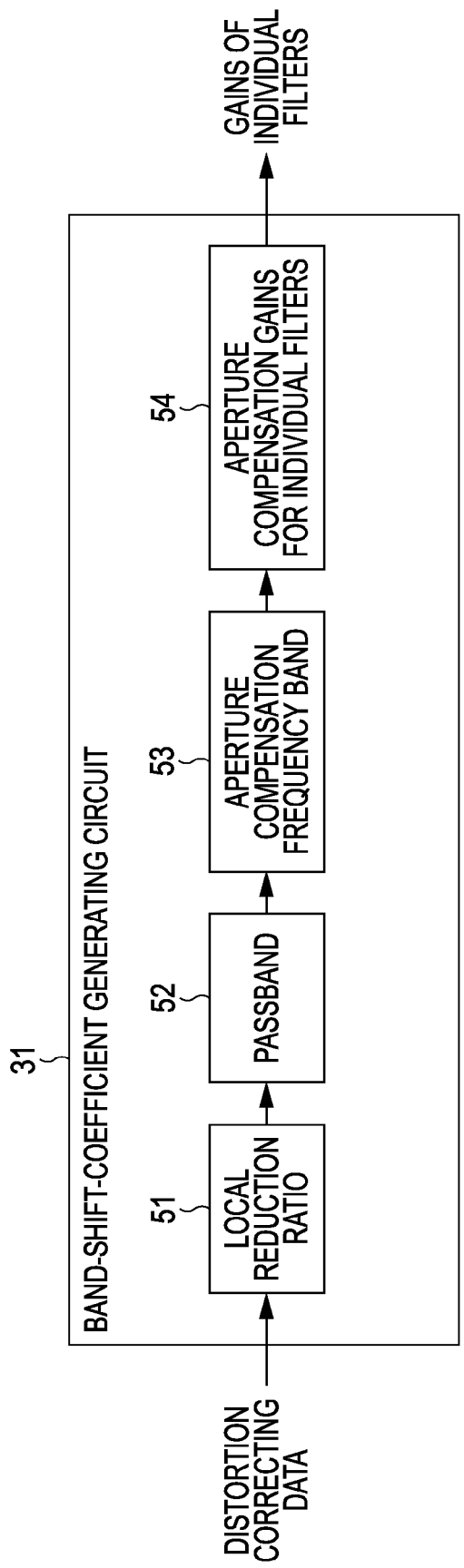

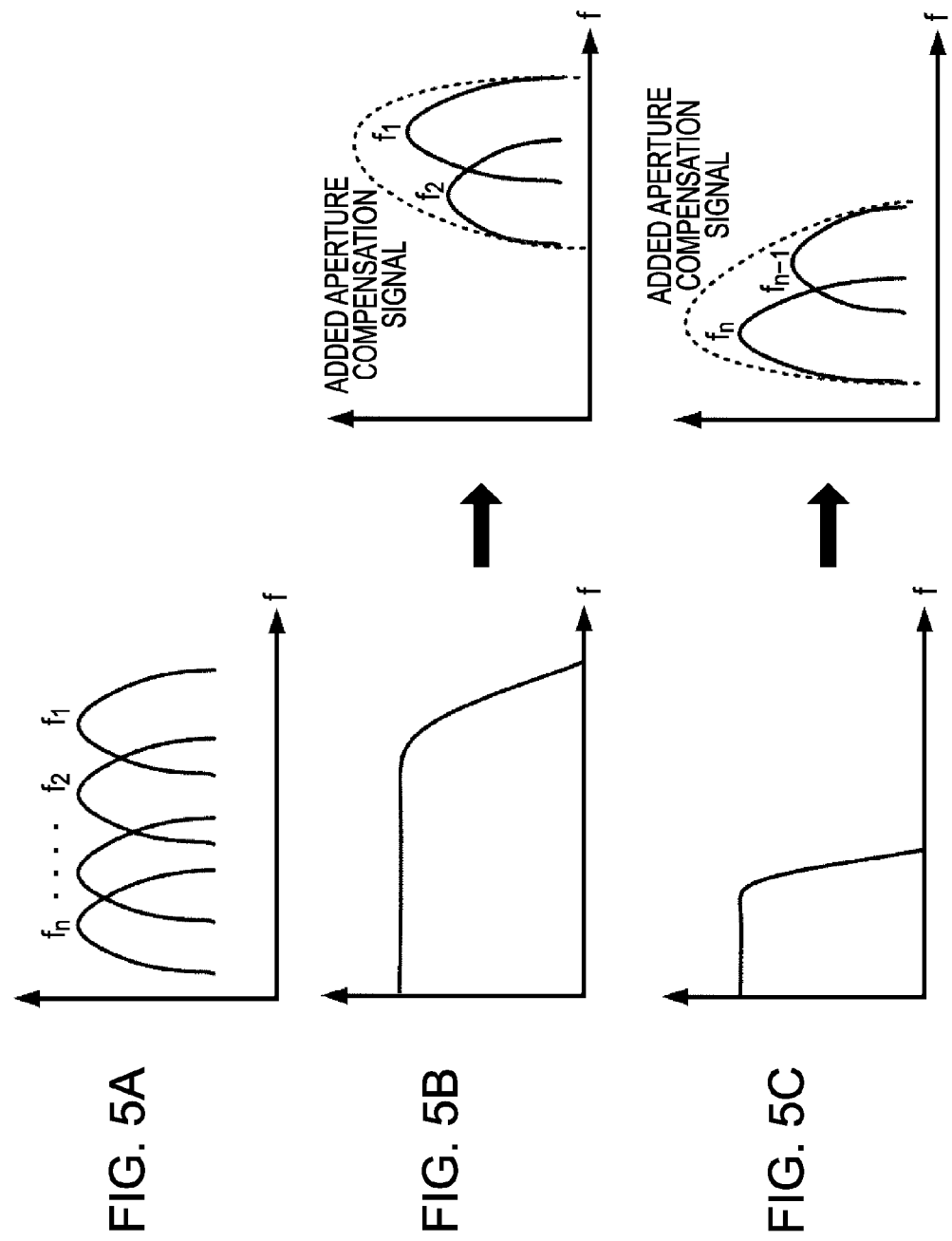

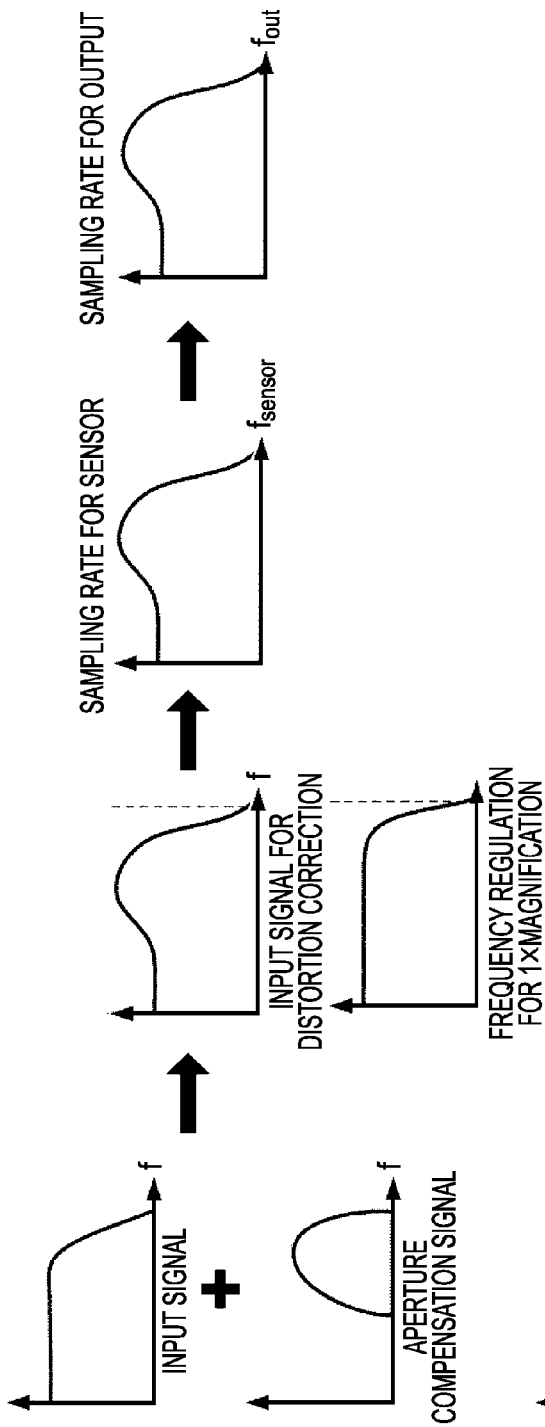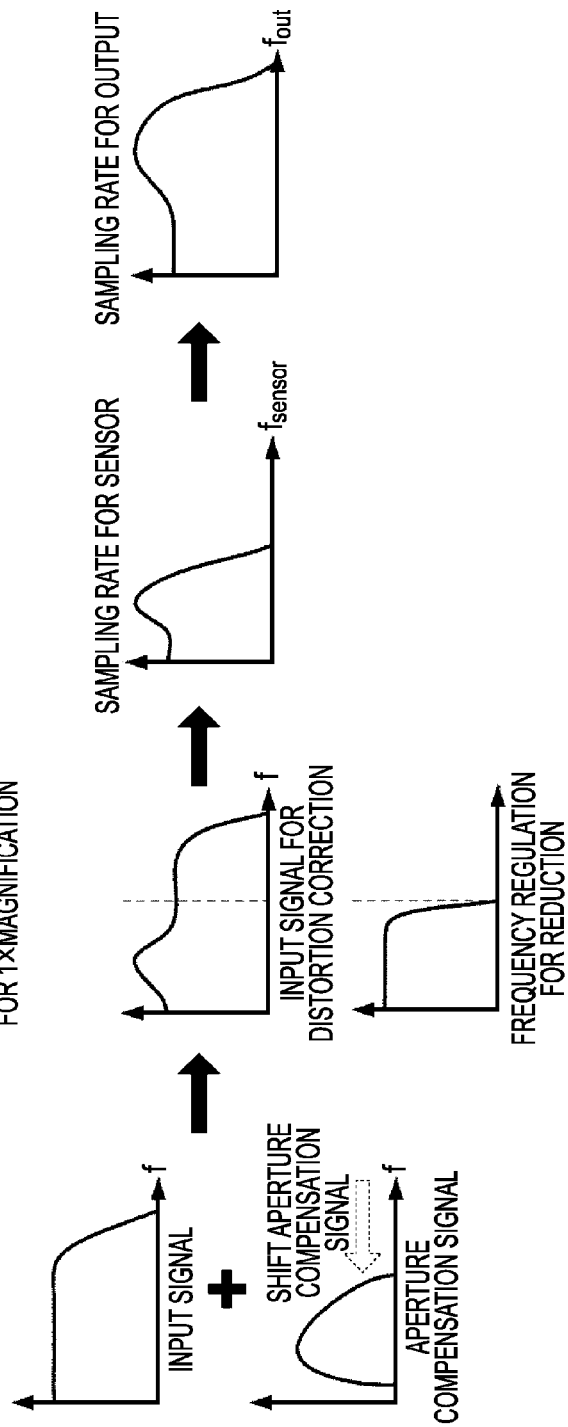
FIG. 6A
FIG. 6B

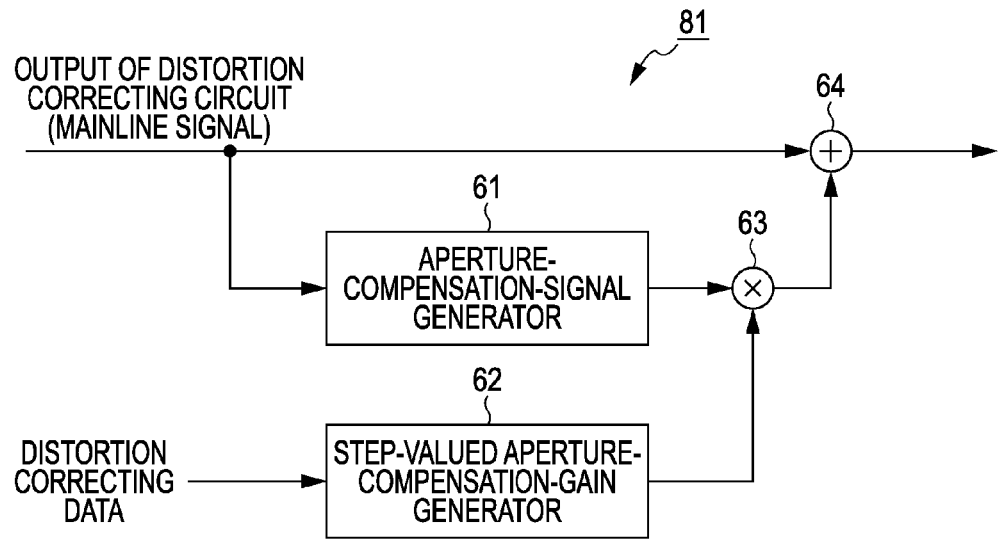
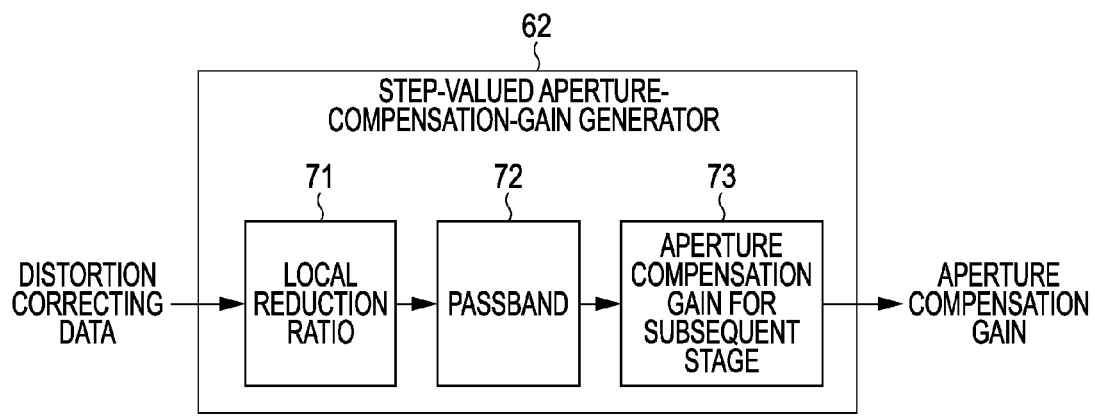

IMAGE PROCESSING METHOD AND APPARATUS

CROSS REFERENCES TO RELATED APPLICATIONS

The present invention contains subject matter related to Japanese Patent Application JP 2006-329567 filed in the Japanese Patent Office on Dec. 6, 2006, the entire contents of which are incorporated herein by reference.

BACKGROUND OF THE INVENTION

1. Field of the Invention

The present invention relates to an image processing method and image processing apparatus in which image processing is executed according to distortion correcting data to correct a non-uniform perceived resolution caused by image distortion correction, thereby achieving a uniform perceived resolution over an entire displayed image.

2. Description of the Related Art

In certain types of existing monitoring cameras or on-vehicle cameras, an image of a wide range is captured using a wide-angle lens, and image signal processing is executed to correct image distortion caused by the curvature of the lens and enlarge or reduce a part of the image. For this purpose, wide-angle image distortion correction is executed.

Furthermore, camera signal processing includes aperture compensation. The aperture compensation serves to emphasize a contour of an image so that the perceived resolution of the image will be improved. By adding aperture compensation signals uniformly over the entire image to emphasize a frequency band, it is possible to obtain an image having a uniform perceived resolution over the entire image.

Furthermore, when an image is reduced by electronic zoom, since frequency band regulation is exercised, an aperture compensation is lost in accordance with the reduction ratio. However, when all regions are reduced substantially by the same factor, since an aperture compensation signal is lost uniformly over the entire image, an image having a uniform perceived resolution over the entire image is output.

Japanese Unexamined Patent Application Publication No. 2005-57605 discloses an image processing apparatus that improves image quality by correcting distortion caused in a captured image by such wide-angle image distortion correction. The image processing apparatus includes a correction parameter encoder that encodes a distortion correction parameter for each zoom point indicating a zoom position of an optical zoom mechanism and stores the distortion correcting parameter in a correction memory, a controlling microcomputer that reads distortion interpolation parameters associated with two zoom points corresponding to zoom positions on the basis of coordinate values of a pixel under distortion correction and zoom position information, a zoom interpolator for interpolating the distortion correction parameters that have been read on the basis of phase relationship between the zoom positions, and a correction parameter decoder that decodes the interpolated distortion correction parameter with respect to an x-y direction and supplies the result to an image signal processor. The image processing apparatus executes distortion correction on the basis of zoom positions, using zoom compression parameters obtained by compressing distortion correction parameters for individual lens positions based on zoom segment points.

SUMMARY OF THE INVENTION

In the image processing apparatus according to the related art, in the case of image distortion correction in which an image is reduced locally, as shown in FIG. 12, band regulation becomes stricter as the reduction ratio increases, so that band regulation is exercised in different manners depending on regions. That is, aperture compensation signals are lost by different ratios between a region where 1× magnification is executed and a region where reduction is executed in the same image. Thus, the perceived resolution of an output image is not uniform.

Recently, in systems for monitoring cameras or on-vehicle cameras, the size of lens is being reduced to minimum in order to reduce the size of camera module. As the size of the lens is reduced in a system, distortion correction or magnification factor conversion through image processing becomes important. Thus, reduction in image quality due to non-uniformity of perceived resolution over an entire image, caused by such image processing, might be problematic.

It is desired that an image processing method and apparatus be provided with which a uniform perceived resolution is maintained in an entire image even after executing distortion correction by different magnification factors within the same image.

According to an embodiment of the present invention, there is provided an image processing method of executing image processing to correct a non-uniform perceived resolution caused by image distortion correction, thereby achieving a uniform perceived resolution over an entire displayed image. The image processing method includes the step of adjusting an aperture compensation signal using distortion correcting data to correct a non-uniform perceived resolution caused in an image through partial conversion of magnification ratio by image distortion correction, thereby achieving a uniform perceived resolution.

According to another embodiment of the present invention, there is provided an image processing method of executing image processing on an image obtained through image distortion correction to correct a non-uniform perceived resolution caused by the image distortion correction, thereby achieving a uniform perceived resolution over an entire displayed image. The image processing method includes the step of calculating a suitable gain using distortion correcting data, and compensating for an aperture compensation signal lost by image distortion correction, thereby achieving a uniform perceived resolution over an entire displayed image.

According to another embodiment of the present invention, there is provided an image processing method of executing image processing on an image prior to image distortion correction to correct a non-uniform perceived resolution caused by the image distortion correction, thereby achieving a uniform perceived resolution over an entire displayed image. The image processing method includes the step of shifting a frequency band in which an aperture compensation signal is added, according to an amount of distortion correction for current coordinate values, the amount of distortion correction being determined from distortion correcting data, thereby achieving a uniform perceived resolution over an entire displayed image.

According to another embodiment of the present invention, there is provided an image processing apparatus for executing image processing according to distortion correcting data to correct a non-uniform perceived resolution caused by image distortion correction, thereby achieving a uniform perceived resolution over an entire displayed image. The image processing apparatus includes aperture-compensation-signal adding means for adding a variable-frequency-band aperture compensation signal to a mainline signal at a stage previous to image distortion correction, the variable-frequency-band aperture compensation signal corresponding to a frequency band in which an aperture compensation signal is lost by the image distortion correction; and step-valued aperture-compensation-gain adjusting means for executing image processing on an image at a stage subsequent to the image distortion correction, using an aperture compensation signal generated on the basis of a step-valued aperture compensation gain calculated using distortion correcting data used in the image distortion correction.

According to these embodiments of the present invention, a uniform perceived resolution is maintained over an entire image even after image distortion correction.

BRIEF DESCRIPTION OF THE DRAWINGS

FIG. 4 is a block diagram showing the configuration of a band-shift-coefficient generating circuit in this embodiment;

FIGS. 5A to 5C are diagrams for explaining generation of a desired aperture compensation signal by adjustment of gains of filter signals in an image processing apparatus according to this embodiment;

FIGS. 6A and 6B are diagrams for explaining 1× magnification and reduction in this embodiment;

FIG. 7 is a block diagram showing the configuration of a step-valued aperture-compensation-gain multiplying circuit in this embodiment;

FIG. 8 is a diagram for explaining step-valued aperture-compensation-gain generation in this embodiment;

DESCRIPTION OF THE PREFERRED EMBODIMENTS

Figure 1:
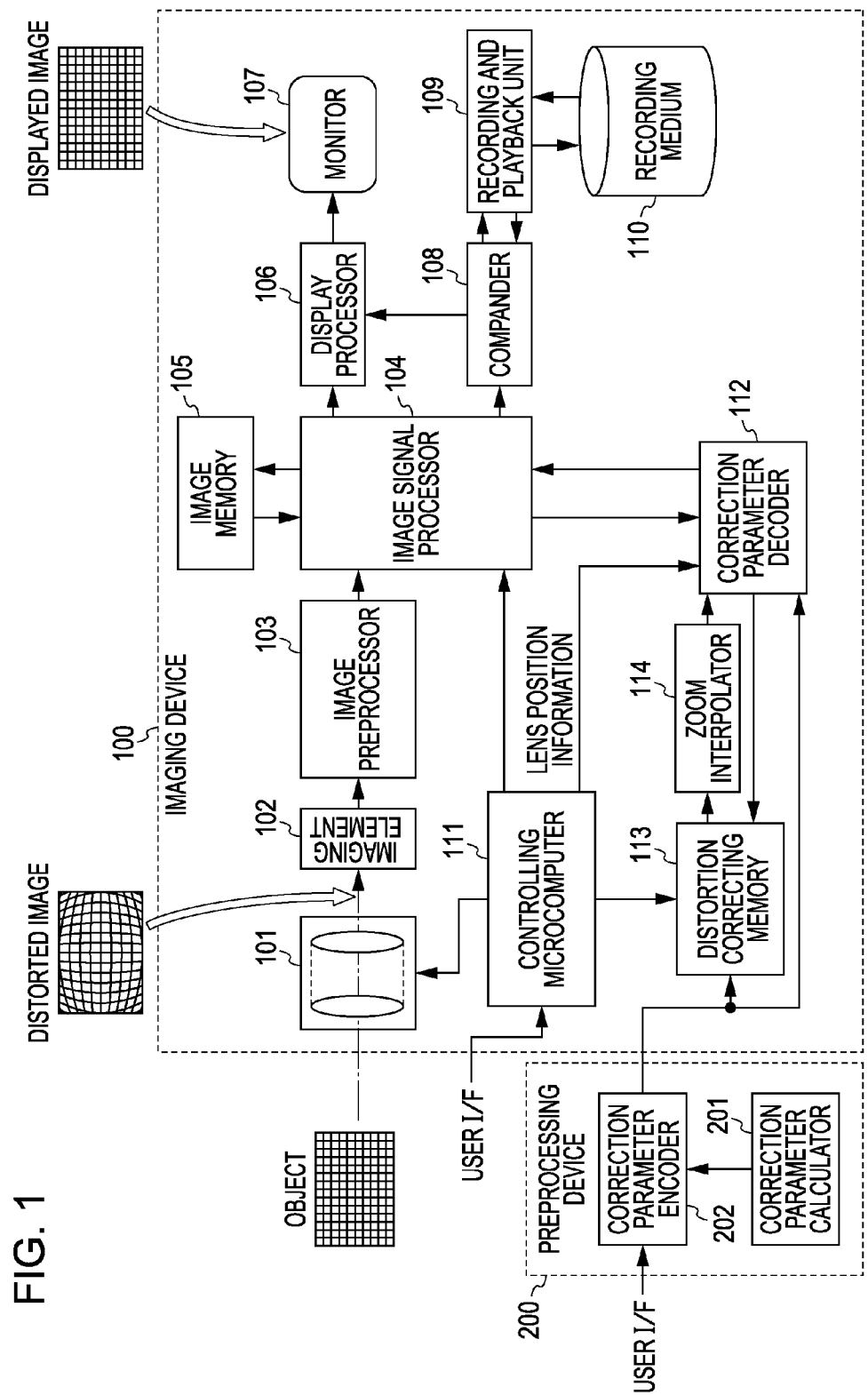
FIG. 1 is a block diagram of an imaging device that executes an image processing method according to an embodiment of the present invention.

FIG. 1 is a block diagram showing the configuration of an imaging device 100 that executes an image processing method according to an embodiment of the present invention.

The imaging device 100 includes an optical block 101, an imaging element 102, an image preprocessor 103, an image signal processor 104, an image memory 105, a display processor 106, a monitor 107, a compander 108, a recording and playback unit 109, a recording medium 110, a controlling microcomputer 111, a correction parameter decoder 112, a distortion correcting memory 113, and a zoom interpolator 114.

Furthermore, a preprocessing device 200 includes a correction parameter calculator 201 and a correction parameter encoder 202.

In the imaging device 100, the optical block 101 includes a set of lenses that condenses light reflected from an object, a driving mechanism for driving the set of lenses, and so forth. The optical block 101 condenses incident light at the imaging element 102. Furthermore, the optical block 101 has an optical zoom function. During an optical zoom operation, the lenses are driven according to control signals supplied from the controlling microcomputer 111.

The imaging element 102 is formed of a charge coupled device (CCD) or complementary metal oxide semiconductor (CMOS) image sensor or the like. The imaging element 102 converts light condensed by the optical block 101 into electric signals, and supplies resulting analog image signals to the image preprocessor 103.

The image preprocessor 103 executes processing such as correlated double sampling (CDS), automatic gain control (AGC), or analog-to-digital (A/D) conversion on the analog image signals supplied from the imaging element 102, and supplies resulting digital image signals to the image signal processor 104.

The image signal processor 104 stores the digital image signals supplied from the image preprocessor 103 in the image memory 105, and executes processing for image quality correction, such as distortion correction. The image memory 105 is formed of, for example, a semiconductor memory such as a dynamic random access memory (DRAM).

The display processor 106 generates image signals for displaying an image on the monitor 107 from image signals supplied from the image signal processor 104 or the compander 108, and outputs the image signals to the monitor 107. The monitor 107 is formed of, for example, a liquid crystal display (LCD).

The compander 108 executes encodes the image signals supplied from the image signal processor 104 to compress the image signals according to a predetermined image format, and supplies the encoded image signals to the recording and playback unit 109. Furthermore, the compander 108 decodes image signals supplied from the recording and playback unit 109 to expand the image signals, and supplies the decoded image signals to the display processor 106.

The recording and playback unit 109 writes the image signals compressed through encoding by the compander 108 to the recording medium 110. Furthermore, the recording and playback unit 109 supplies image data read from the recording medium 110 to the compander 108. The recording medium 110 is formed of, for example, a portable semiconductor memory, optical disk, or hard disk.

The controlling microcomputer 111 outputs commands or the like for instructing certain operations according to control signals supplied from a user interface (not shown), for example, to the image signal processor 104. Furthermore, the controlling microcomputer 111 outputs position information or the like of the lenses in the optical block 101 to the correction parameter decoder 112. Furthermore, the controlling microcomputer 111 supplies clock signals for reading or writing data to the distortion correcting memory 113.

According to information supplied from the controlling microcomputer 111, the correction parameter decoder 112 decodes a distortion correcting parameter read from the distortion correcting memory 113, expanded in a zoom direction through interpolation by the zoom interpolator 114, with respect to an x-y direction as a correction amount parameter associated with each pixel, and supplies the correction amount parameter to the image signal processor 104.

The distortion correcting memory 113 receives and holds a distortion correcting parameter from the correction parameter encoder 202 of the preprocessing device 200, generated by compressing distortion correction coordinates. Then, the distortion correcting memory 113 outputs the distortion correcting parameter held therein to the zoom interpolator 114 in response to a request from the correction parameter decoder 112.

The zoom interpolator 114 executes interpolation with respect to a zoom direction using the distortion correcting parameter read from the distortion correcting memory 113, and supplies a distortion correcting parameter obtained through the processing to the correction parameter decoder 112.

In the preprocessing device 200, the correction parameter calculator 201 creates distortion correction coordinates for all the pixels in a captured image on the basis of lens data of the lenses in the optical block 101, and outputs the distortion correction coordinates to the correction parameter encoder 202.

The correction parameter encoder 202 compresses the distortion correction coordinates for all the pixels, supplied from the correction parameter calculator 201, into a distortion correcting parameter, and stores the distortion correcting parameter in the distortion correcting memory 113. Furthermore, the correction parameter encoder 202 supplies lattice information used for encoding to the correction parameter decoder 112.

Next, an operation of the imaging device 100 shown in FIG. 1 will be described.

In the imaging device 100, light reflected from an object is condensed at the imaging element 102 by the optical block 101, and the imaging element 102 outputs analog image signals to the image preprocessor 103. The image preprocessor 103 executes processing such as CDS or AGC on the analog signal supplied from the imaging element 102, and further executes A/D conversion, and the resulting digitized image signals are supplied to the image signal processor 104.

The image signal processor 104 stores the input digital image signals in the image memory 105. Furthermore, the image signal processor 104 executes image quality correction on the digital image signals, such as distortion correction, according to a correction amount parameter received from the correction parameter decoder 112. The image signals that have undergone the processing are supplied to the display processor 106, whereby the captured image in which distortion has been corrected is displayed on the monitor 107.

Furthermore, the image signals that have undergone image quality correction in the image signal processor 104 are encoded by the compander 108 for compression in a predetermined image format, and the encoded image signals are written to the recording medium 110 by the recording and playback unit 109, whereby a captured image is recorded. The image data encoded for compression may be sent to an external device, for example, via a communication interface.

On the other hand, when playing back image data recorded on the recording medium 110, the image data is read by the recording and playback unit 109 and is decoded by the compander 108 for expansion, and the decoded image signals are supplied to the display processor 106, whereby an image that is played back is displayed on the monitor 107.

When captured image signals are displayed and recorded, optical distortion in an original image is digitally corrected in the image signal processor 104. The optical distortion is caused due to optical characteristics of the lenses in the optical block 101.

In this embodiment, in the preprocessing device 200, the distortion correction coordinates of all the pixels are encoded, and the result is stored in the distortion correcting memory 113. Then, upon receiving coordinates on a captured image from the controlling microcomputer 111, the correction parameter decoder 112 obtains corresponding compressed data from the distortion correcting memory 113 via the zoom interpolator 114, decodes the compressed data to restore the distortion correction coordinates, and outputs the distortion correction coordinates to the image signal processor 104. Thus, the image signal processor 104 can execute distortion correction using the received distortion correction coordinates or the like.

Figure 2:
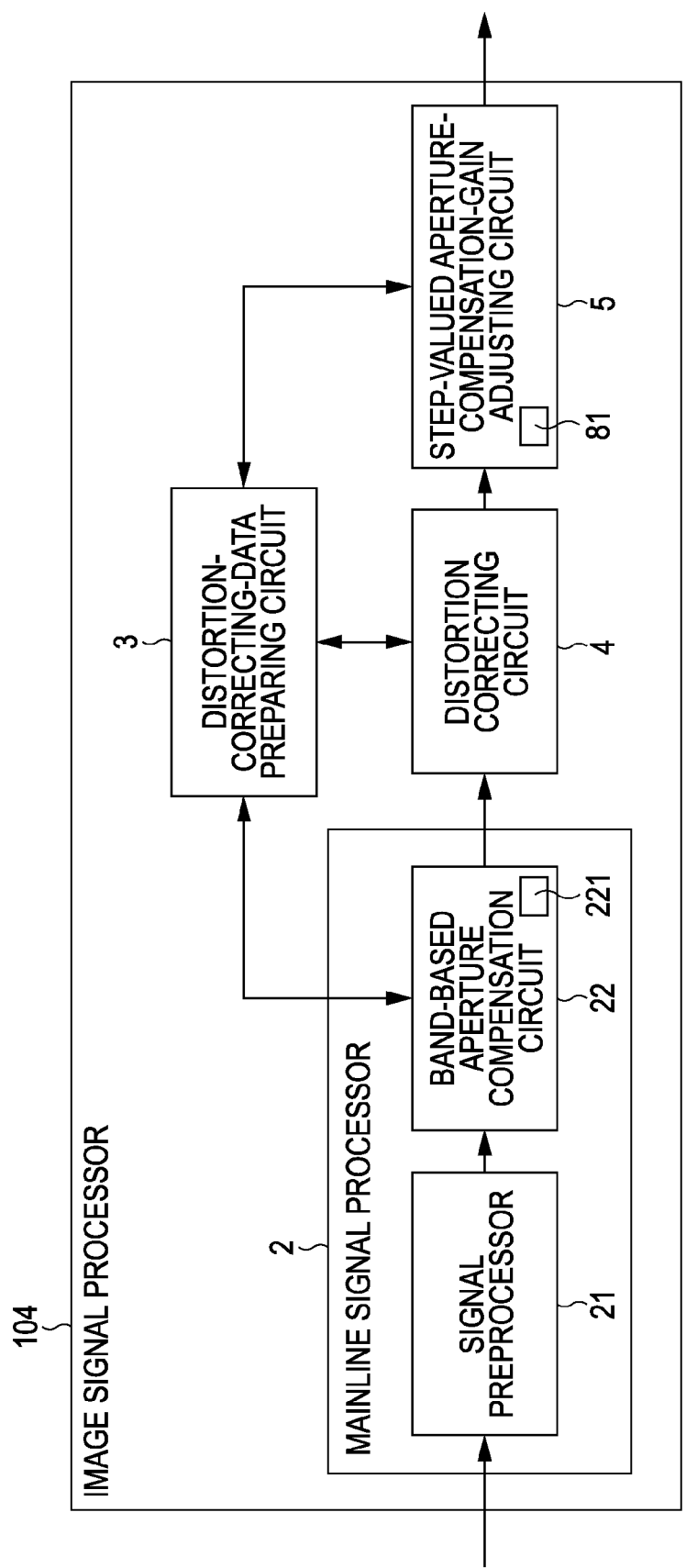
FIG. 2 is a block diagram showing a configuration for executing the image processing method according to the embodiment, included in an image signal processor of the imaging device shown in FIG. 1.

FIG. 2 is a block diagram showing the configuration of the image signal processor 104 of the imaging device 100 shown in FIG. 1 for carrying out the image processing method according to this embodiment.

The image signal processor 104 includes a mainline signal processor 2, a distortion-correcting-data preparing circuit 3, a distortion correcting circuit 4, and a step-valued aperture-compensation-gain adjusting circuit (step-valued aperture-compensation-gain adjusting means) 5.

The mainline signal processor 2 is a circuit that processes mainline signals. The distortion-correcting-data preparing circuit 3 is a circuit that prepares distortion correcting data used in the distortion correcting circuit 4.

The distortion correcting circuit 4 is a circuit that executes distortion correction by adding image distortion correcting data prepared in advance to an image captured by a wide-angle lens and 180 degrees wide vertically and horizontally.

The step-valued aperture-compensation-gain adjusting circuit 5 is a circuit that adjusts a step-valued aperture compensation gain for data output from the distortion correcting circuit 4.

The mainline signal processor 2 includes a signal preprocessor 21 and a band-based aperture compensation circuit (aperture compensation signal adding means) 22.

The signal preprocessor 21 separates signals supplied from a sensor into luminance signals and chrominance signals and adjusts image quality.

Figure 3:
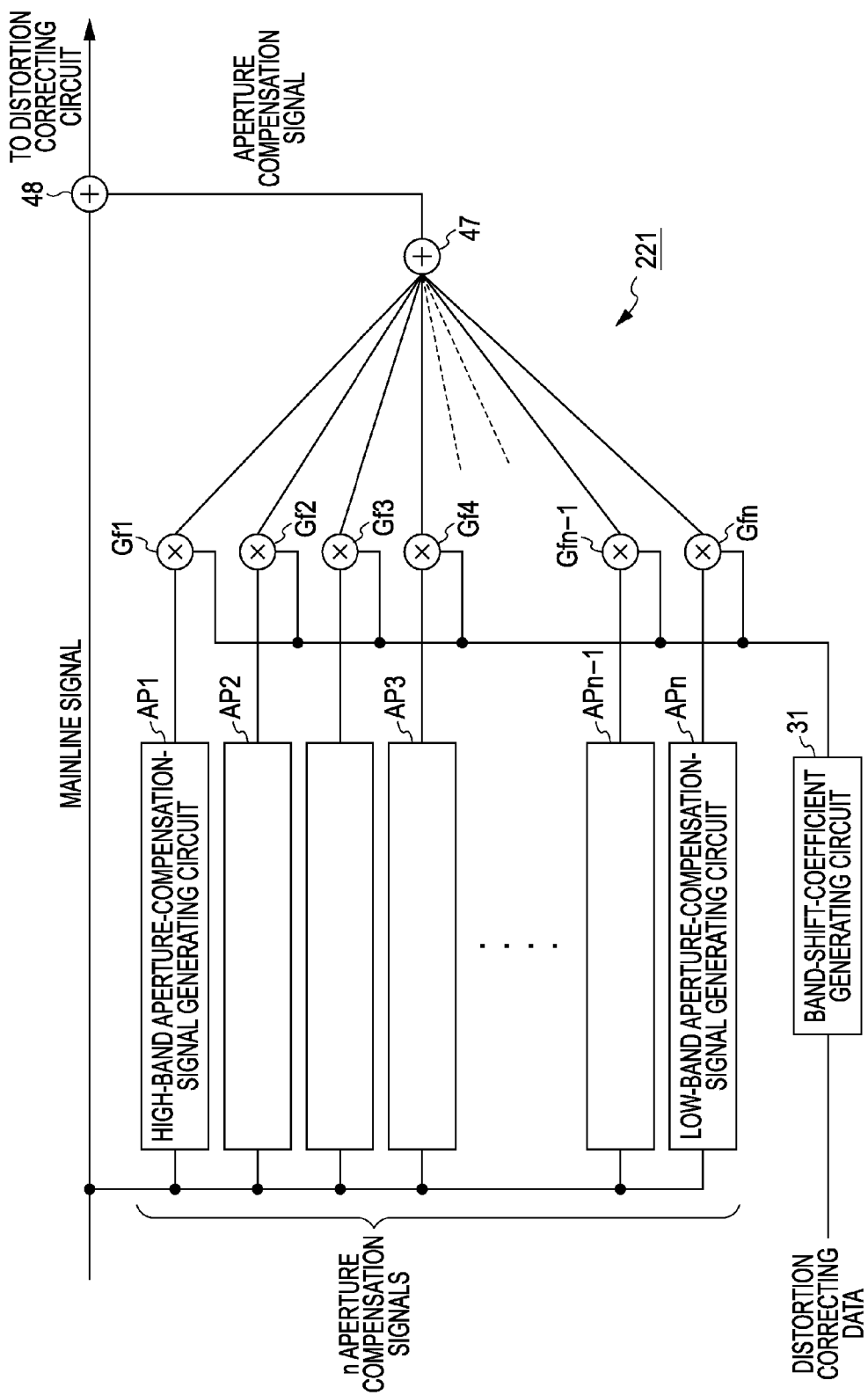
FIG. 3 is a block diagram showing the configurations of an aperture-compensation-signal generating circuit and a band-variable aperture-compensation-signal adding circuit included in a band-based aperture compensation circuit in this embodiment.

As shown in FIG. 3, the band-based aperture compensation circuit 22 includes a plurality of aperture-compensation-signal generating circuits AP1, AP2, . . . and APn for high bands to low bands, and a band-variable aperture-compensation-signal adding circuit 221.

FIG. 3 is a block diagram showing the configuration of the aperture-compensation-signal generating circuits AP1, AP2, . . . and APn and the band-variable aperture-compensation-signal adding circuit 221.

The band-variable aperture-compensation-signal adding circuit 221 includes a band-shift-coefficient generating circuit 31, multiplying circuits Gf1, Gf2, . . . and Gfn, and adding circuits 47 and 48.

The band-shift-coefficient generating circuit 31 is a circuit that generates band shift coefficients for shifting the frequency band of aperture compensation signal using distortion correcting data used in the distortion correcting circuit 4, i.e., a circuit that generates band shift coefficients corresponding to aperture compensation signals individually generated by the aperture-compensation-signal generating circuits AP1, AP2, . . . and APn.

The multiplying circuits Gf1, Gf2, . . . and Gfn multiplies the aperture compensation signals individually generated by the aperture-compensation-signal generating circuits AP1, AP2, . . . and APn with the band shift coefficients generated by the band-shift-coefficient generating circuit 31, and outputs the results to the adding circuit 47.

The adding circuit 47 calculates the sum of the results of multiplication of the aperture compensation signals, individually output from the multiplying circuits Gf1, Gf2, . . . and Gfn, and outputs the result to the adding circuit 48. The adding circuit 48 is a circuit that adds the output of the adding circuit 47 to a mainline signal.

With this configuration, in the image processing method according to this embodiment, even when distortion is corrected with different magnification ratios within the same image, it is possible to achieve a uniform perceived resolution over the entire image.

Furthermore, in the image processing method according to this embodiment, through adjustment of aperture compensation signal using distortion correcting data, it is possible to correct non-uniformity of resolution in an image, caused by partial changing of magnification ratio in a camera system that corrects image distortion.

Furthermore, at a stage previous to the distortion correcting circuit 4 in the image signal processor 104, the band in which an aperture compensation signal is added is shifted in consideration of an amount of distortion correction for current coordinates obtained from distortion correcting data. Thus, it is possible to obtain an ideal aperture compensation signal with which a uniform perceived resolution can be achieved even after distortion correction.

Furthermore, at a stage subsequent to the distortion correcting circuit 4 in the image signal processor 104, in order to compensate for an aperture compensation signal that is lost by distortion correction, correction is executed using an appropriate gain calculated on the basis of distortion correcting data. Thus, it is possible to obtain an ideal aperture compensation signal with which a uniform perceived resolution can be achieved over an entire image even after distortion correction.

This embodiment relates to an image processing method and apparatus for adding an appropriate aperture compensation signal with which an appropriate perceived resolution is maintained even after correcting image distortion in a camera digital signal processor (DSP) having a function for enlarging or reducing a specific area using an image distortion correction function and outputting the result, such as partial electronic zoom.

When generating an image with different magnification ratios within the image, it is not appropriate to add uniform aperture compensation signal over the entire image, since an image with non-uniform perceived resolution is output. Thus, an aperture compensation signal that is added should actually be changed in accordance with a zoom ratio or a distortion correction ratio so that an output image has a uniform perceived resolution.

It is presupposed that an imaging device in which the image processing method according to this embodiment is used includes a wide-angle distortion correcting circuit. In a camera system employing wide-angle distortion correction, an image without a sense of unnaturalness can be obtained by adding image distortion correcting data prepared in advance to an image captured by a wide-angle lens and 180 degrees wide vertically and horizontally.

In this embodiment, in addition to the wide-angle distortion correction circuit that has hitherto been used, in the image signal processor 104 at a stage previous to distortion correction, the band-variable aperture-compensation-signal adding circuit 221 and a step-valued aperture-compensation-gain multiplying circuit 81 that multiplies data output from the distortion correcting circuit 4 with a step-valued aperture compensation gain are provided. The band-variable aperture-compensation-signal adding circuit 221 and the step-valued aperture-compensation-gain multiplying circuit 81 are connected to the distortion-correcting-data preparing circuit 3 for the purpose of calculating coefficients for shifting the frequency band of aperture compensation signal and calculating a step-valued aperture compensation gain using the distortion correcting data used in the distortion correcting circuit 4.

First, variable-band aperture-compensation-signal addition will be described.

In existing methods of generating an aperture compensation signal, an aperture compensation signal is generated from high-band and low-band aperture compensation signals. Since the aperture compensation signal is added in a certain frequency band in an image, in an image such as an image in which distortion is corrected by partial electronic zoom, band regulation is exercised in different manners in individual regions, so that an image with non-uniform perceived resolution is output.

In view of this problem, according to this embodiment, in contrast to exiting methods in which an aperture compensation signal is added in a fixed frequency band, by the band-variable aperture-compensation-signal adding circuit 221 configured as shown in FIG. 3, a frequency band in which an aperture compensation signal is lost by distortion correction is estimated using distortion correcting data used in wide-angle distortion correction, thereby generating an appropriate aperture compensation signal that is maintained even after distortion correction, and the aperture compensation signal is added to mainline signals.

In frequency band regulation, a larger amount of high-frequency components is lost as the ratio of distortion correction increases, so that only signals of low-frequency components remain. Thus, in the case of a region with a large distortion correction ratio, when adding aperture compensation signals, the frequency band of aperture compensation signal that is added is shifted to the lower side. Accordingly, it is possible to obtain an image in which an aperture compensation signal remains appropriately even after passing through the distortion correcting circuit 4.

The band-variable aperture-compensation-signal adding circuit 221 shown in FIG. 3 includes a plurality of aperture-compensation-signal generating circuits AP1, AP2, AP3, . . . and APn for high bands to low bands, aperture compensation signals are individually multiplied by associated band-shift coefficients, and the results of the multiplication are summed up to yield a final aperture compensation signal. The aperture compensation signal is added to a mainline signal, and the result is input to the distortion correcting circuit 4 at the subsequent stage.

The band-shift-coefficient generating circuit 31 calculates gains for individual filters from distortion correcting data supplied from the distortion-correcting-data preparing circuit 3. Referring to FIG. 4, in order to calculate gain coefficients 54 for the individual filters, first, a local reduction ratio 51 of a current pixel is calculated using the distortion correcting data. The local reduction ratio 51 can be calculated based on proportional relationship between distortion correction ratio and image reduction ratio. Then, a passband 52 of signals in the distortion correcting circuit 4 is estimated using the local reduction ratio 51. As described earlier, the frequency band regulation becomes stricter as the reduction ratio increases, so that a large amount of signals is lost. Then, on the basis of the estimated passband 52, an optimal frequency band 53 of aperture compensation signal, with which an aperture compensation signal are not lost even after distortion correction, is determined. In this method, in which the frequency band subject to regulation can be estimated, an ideal signal with which an aperture compensation signals is not lost even after distortion correction can be determined uniquely.

FIG. 4 is a functional block diagram of the band-shift-coefficient generating circuit 31. In order to generate a desired aperture compensation signal, the band-shift-coefficient generating circuit 31 adjusts gains for filter signals f1 to fn, as shown in FIG. 4. For example, in the case of 1× magnification, an aperture compensation signal is generated by applying large gains to f1, f2, and so forth on the high-band side so that a contour is emphasized. On the other hand, in the case of reduction, an aperture compensation signal is generated by applying large gains to fn, fn−1, and so forth on the low-band side so that the aperture compensation signal is not lost by band regulation. By using a plurality of filter signals, adjustment with improved precision is allowed. That is, the frequency band in which an aperture compensation signal is added is shifted by changing the individual gains for the filter signals.

FIG. 5A shows a plurality of band-variable aperture compensation signals. FIG. 5B shows an aperture compensation signal in which high-band components remain, generated for a region of weak band regulation (1× magnification). FIG. 5C shows an aperture compensation signal in which low-band components remain, generated for a region of severe band regulation (reduction).

FIG. 6A is a diagram for explaining 1× magnification, and FIG. 6B is a diagram for explaining reduction.

When the function of variable-band aperture-compensation-signal addition is ON, the aperture compensation signal obtained through the processing described above is added to a mainline signal. Thus, an ideal aperture compensation signal, with which a uniform perceived resolution is achieved even after distortion correction, is added, as shown in FIG. 6.

Next, the step-valued aperture-compensation-gain multiplying circuit 81 shown in FIG. 7 will be described.

In existing methods, an image obtained through distortion correction is directly converted into data for output, for example, in the NTSC (National Television Standards Committee) format. However, when electronic zoom is applied locally, regions with different band regulations due to the local zoom ratio exist in the image, so that the perceived resolution is not uniform over the entire image.

According to this embodiment, the non-uniformity of perceived resolution, caused by image distortion correction, is corrected by executing image processing on the image obtained through the image distortion correction, thereby achieving a uniform perceived resolution over the entire image. That is, an aperture-compensation-signal generator 61 generates an aperture compensation signal from an image obtained through distortion correction, a multiplying circuit 63 multiplies the aperture compensation signal by a step-valued aperture compensation gain generated on the basis of a distortion correction ratio of a current pixel, and an adding circuit 64 adds the resulting aperture compensation signal to a mainline signal.

Similarly to generation of coefficients for shifting the frequency band in the previous stage, a larger amount of high-frequency components is lost by frequency band regulation as the distortion correction ratio increases, so that only low-frequency components remain. Thus, an image with non-uniform perceived resolution is output. In an image obtained through distortion correction with different amounts of distortion correction depending on regions, it is desired to achieve a uniform perceived resolution over the entire image by applying large aperture compensation gains in regions with large amounts of distortion correction to compensate for lost signals while not applying aperture compensation gains in regions with small amounts of distortion correction.

A step-valued aperture-compensation-gain generator 62, configured as shown in FIG. 8, calculates an aperture compensation gain using distortion correction data used in the distortion correcting circuit 4. First, the step-valued aperture-compensation-gain generator 62 calculates a local reduction ratio 71 of a current pixel using distortion correcting data. The local reduction ratio 71 can be calculated based on proportional relationship between distortion correction ratio and image reduction ratio.

Then, a passband 72 of signals in the distortion correcting circuit 4 is estimated using the local reduction ratio 71. As described earlier, the frequency band regulation becomes stricter as the reduction ratio increases, so that a larger amount of signals is lost.

Figure 9:
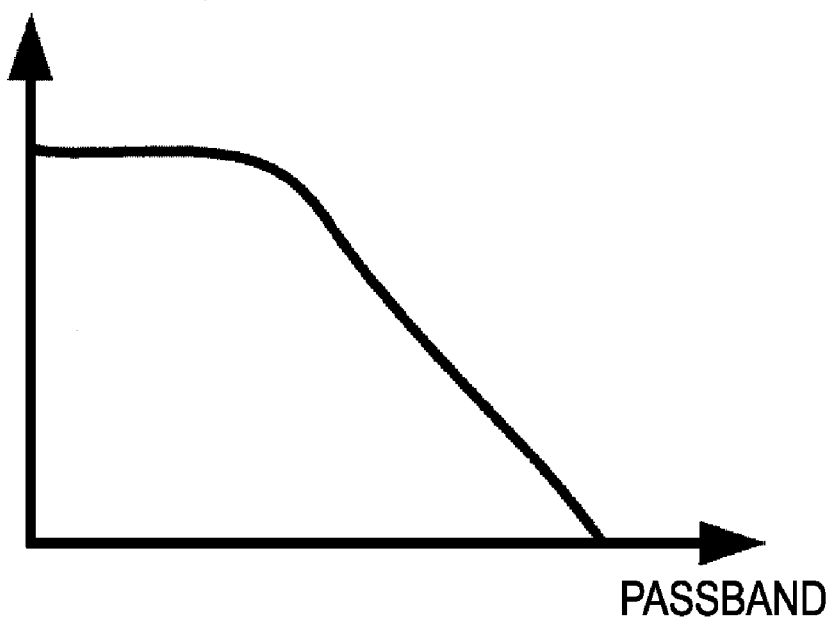
FIG. 9 is a graph showing characteristic relationship between passband and aperture compensation gain in this embodiment.
Figure 10:
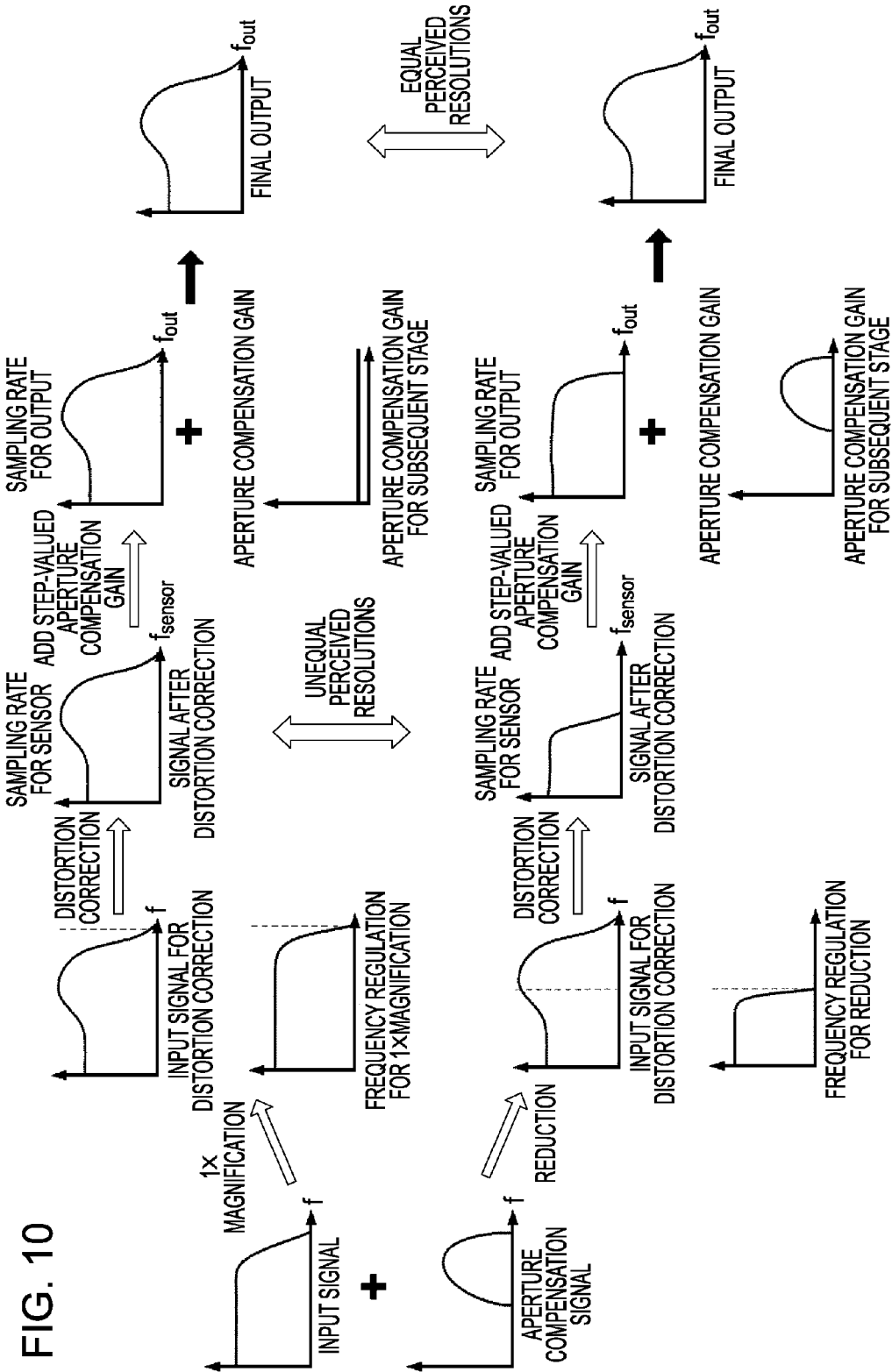
FIG. 10 is a diagram for explaining the flow of step-valued aperture-compensation-gain multiplication in this embodiment.

Then, on the basis of the estimated passband 72, a step-valued gain 73 for multiplying an aperture compensation signal is calculated. As will be understood from FIG. 9 showing relationship between passband and aperture compensation gain, the aperture compensation gain increases as the passband becomes narrower, and the aperture compensation gain decreases as the passband becomes wider. That is, a larger amount of aperture compensation signal is lost as the band regulation of the circuit becomes stricter, so that an aperture compensation signal should be multiplied by a correspondingly large aperture compensation gain in order to compensate for the lost aperture compensation signal. On the other hand, in the case of weak band regulation, such as 1× magnification, it is not necessary to apply a large aperture compensation gain (refer to FIG. 10).

The aperture compensation gain calculated as described is multiplied by an aperture compensation signal generated from a mainline signal to generate an aperture compensation signal that is added to a signal obtained through distortion correction. By determining a suitable aperture compensation gain on the basis of distortion correcting data, smooth frequency-band characteristics can be maintained in a resulting signal. When the step-valued aperture-compensation-gain multiplying function is ON, an aperture compensation gain calculated for an entire image is multiplied. Thus, a uniform perceived resolution can be maintained in an image even after image distortion correction.

By combining band-variable aperture compensation signal addition executed before image distortion correction and step-valued aperture-compensation-gain multiplication executed after image distortion correction as described above, an image having a uniform perceived resolution can be obtained.

Figure 11A:
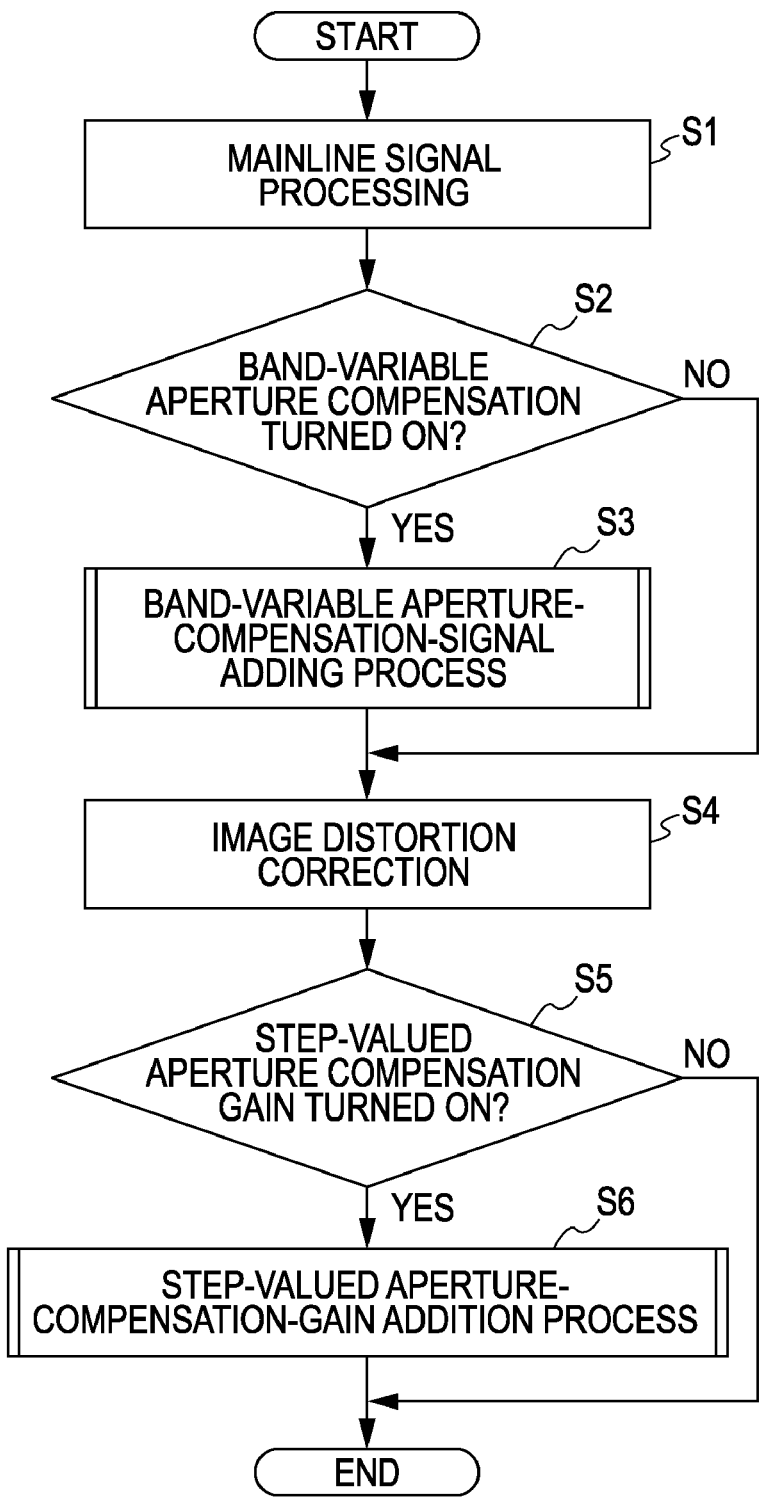
FIGS. 11A to 11C are flowcharts of the image processing method according to this embodiment.
Figure 11B:
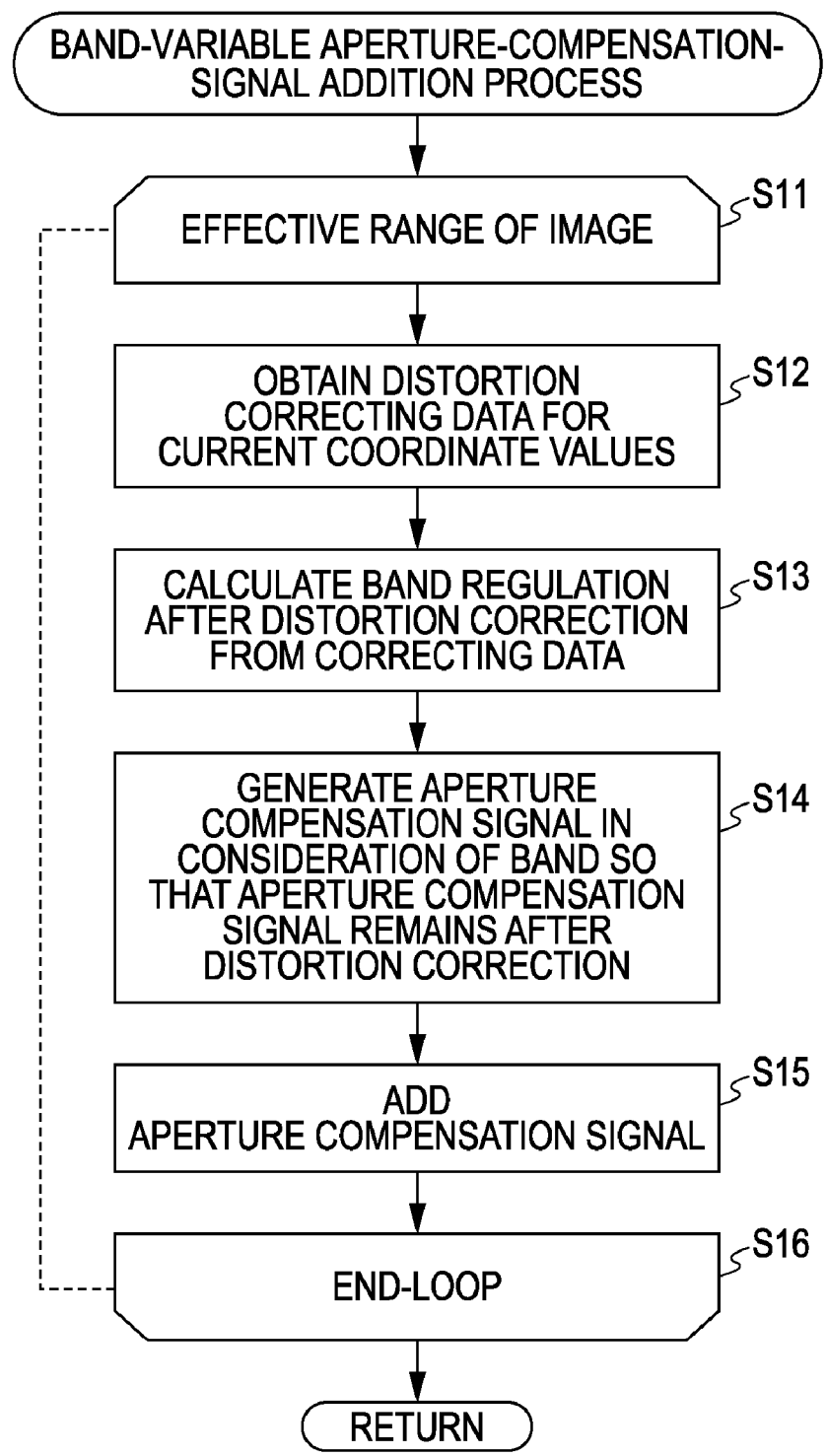
Figure 11C:
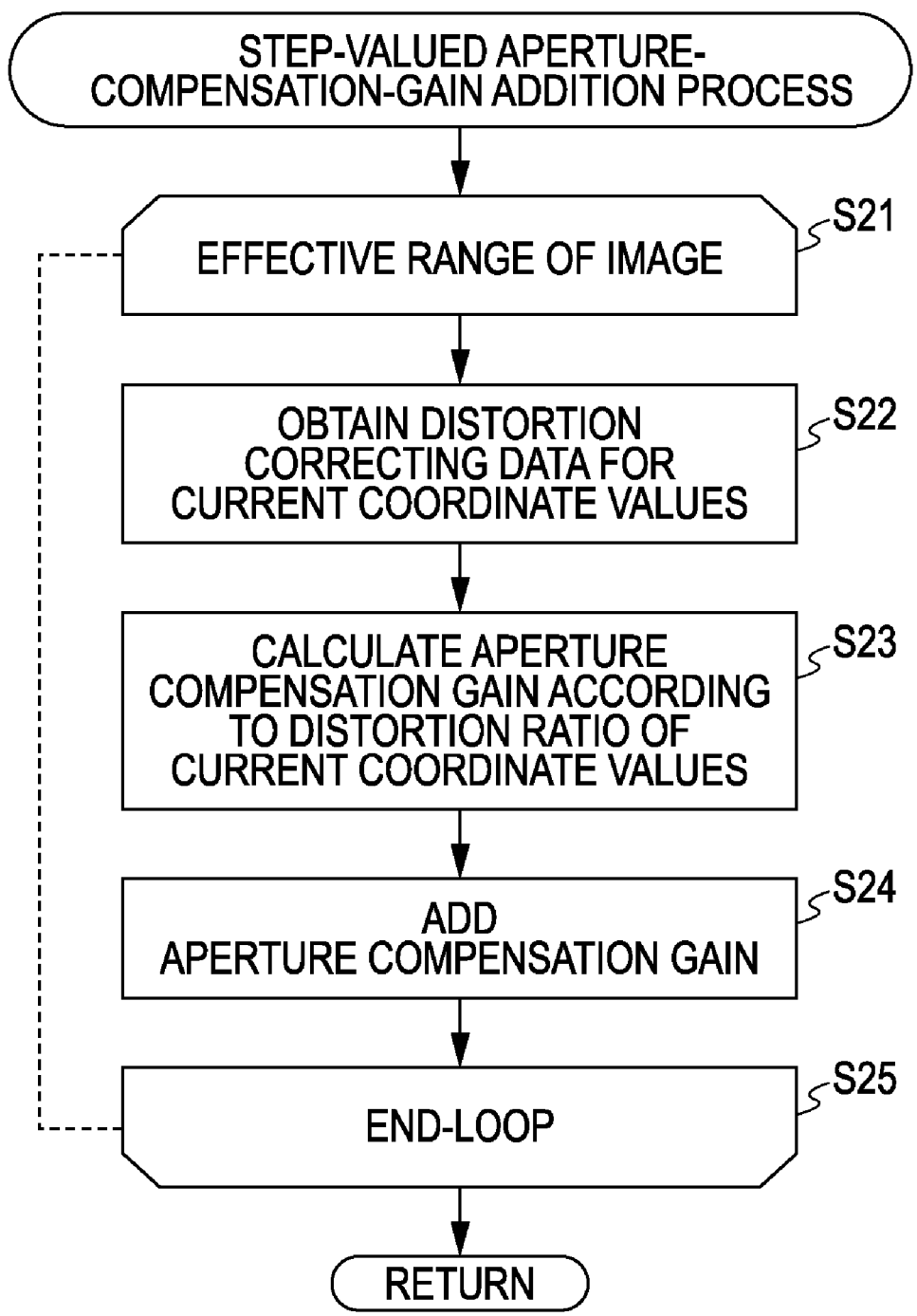
Figure 12:
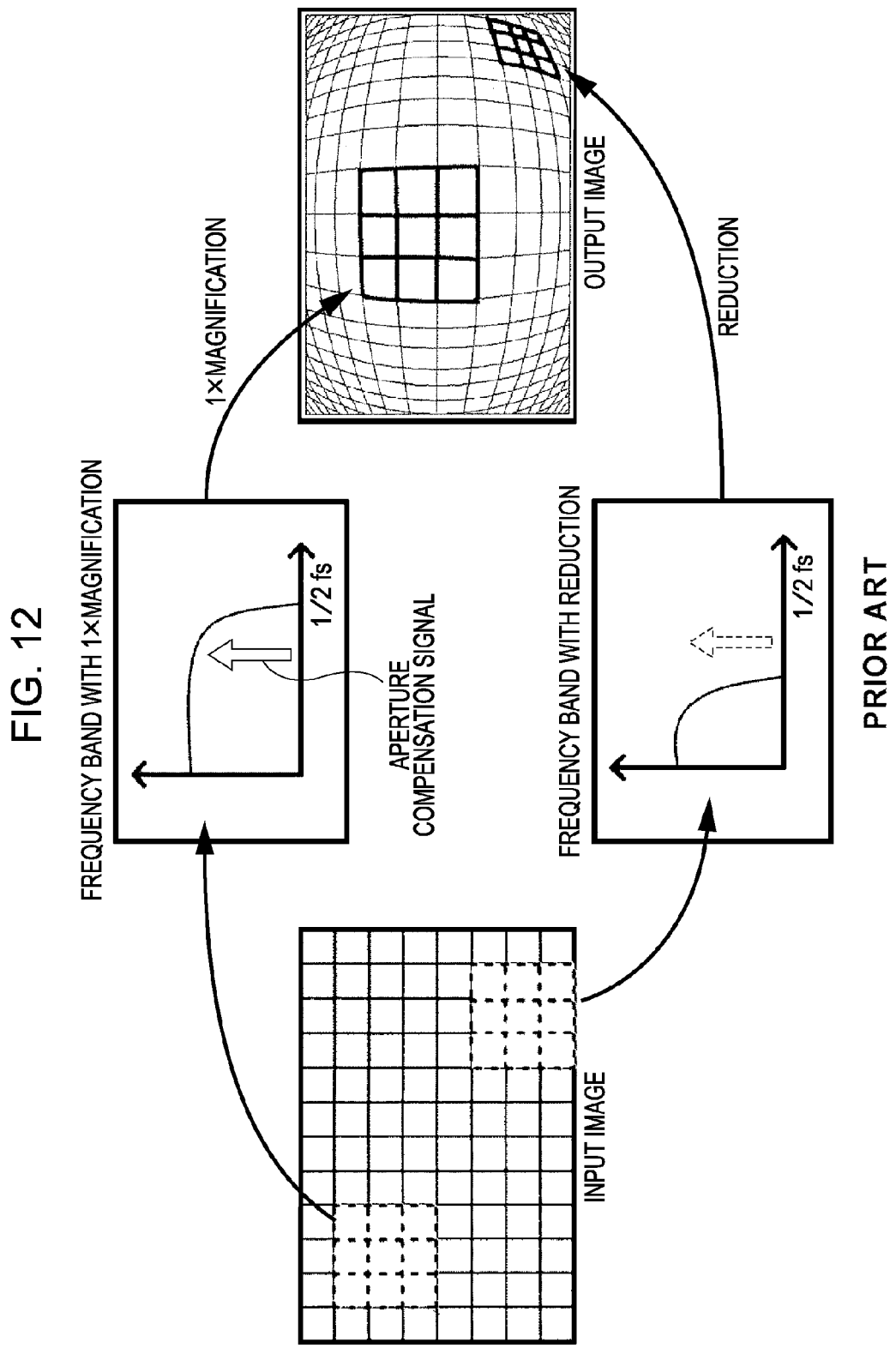
FIG. 12 is a diagram for explaining a problem of an image processing apparatus according to the related art.

FIGS. 11A to 11C are flowcharts of an image distortion correcting process, a variable-band aperture-compensation-signal adding process, and a step-valued aperture-compensation-gain adding process.

FIG. 11A is a main flowchart of the image processing method according to this embodiment. FIG. 11B is a flowchart of the variable-band aperture-compensation-signal adding process in the main flowchart shown in FIG. 11A. FIG. 11C is a flowchart of the step-valued aperture-compensation-gain adding process.

Referring to the flowcharts shown in FIGS. 11A, 11B, and 11C, the variable-band aperture-compensation signal adding process shown in FIG. 11B is executed in step S3 in the main flowchart shown in FIG. 11A, and the step-valued aperture-compensation-gain adding process shown in FIG. 11C is executed in step S6 in the main flowchart.

In the variable-band aperture-compensation signal adding process shown in FIG. 11B, an effective range of image is set (step S11), distortion correcting data for current coordinate values is obtained (step S12), and band regulation after distortion correction is calculated on the basis of the distortion correcting data (step S13). Then, an aperture compensation signal is generated in consideration of frequency band so that the aperture compensation signal will remain even after distortion correction (step S14), and the aperture compensation signal generated is added to a mainline signal (step S15). The processing from step S12 to step S15 is executed over the entire effective range of image (step S16).

In the step-valued aperture-compensation-gain adding process shown in FIG. 11C, an effective range of image is set (step S21), distortion correcting data for current coordinate values is obtained (step S22), and an aperture compensation gain is calculated according to the distortion ratio of the current coordinate values (step S23). Then, the aperture compensation gain calculated is added (step S24). The processing from step S22 to step S24 is executed over the entire effective range of image (step S25).

As described above, according to this embodiment, in processing involving partial electronic zoom associated with image distortion correction, non-uniformity of perceived resolution over the entire image is corrected.

Furthermore, it is possible to estimate frequency band regulation after image distortion correction using distortion correcting data. Thus, it is possible to add an aperture compensation signal effectively.

Furthermore, since an aperture compensation signal is generated from a plurality of signals, it is possible to control the aperture compensation signal with an improved precision.

Furthermore, by controlling the gain of aperture compensation signal using distortion correcting data after image distortion correction, smooth frequency characteristics can be achieved.

Furthermore, use of distortion correcting data proposed herein can be applied to techniques for improvement of image quality, such as shading correction.

Furthermore, it is also possible to improve image quality by adjusting an aperture compensation signal in an existing zoom function.

It should be understood by those skilled in the art that various modifications, combinations, sub-combinations and alterations may occur depending on design requirements and other factors insofar as they are within the scope of the appended claims or the equivalents thereof.

What is claimed is:

1. A method of executing image processing to correct a non-uniform perceived resolution caused by image distortion correction with different magnification ratios in an image, thereby achieving a uniform perceived resolution over the image, the method comprising:
    adding a variable-frequency-band aperture compensation signal to a mainline signal at a stage prior to the image distortion correction, the variable-frequency-band aperture compensation signal corresponding to a frequency band in which an aperture compensation signal is lost by the image distortion correction;
    calculating distortion correcting data when a partial conversion of magnification ratio is applied to the image caused by the image distortion correction; and
    executing image processing on the image at a stage subsequent to the image distortion correction, using the aperture compensation signal generated on the basis of a step-valued aperture compensation gain calculated using the calculated distortion correcting data used in the image distortion correction,
    wherein,
        the step of adding a variable-frequency-band aperture compensation signal comprises calculating coefficients for shifting the frequency band of the aperture compensation signal on the basis of the distortion correcting data used in the image distortion correction.

2. An image processing apparatus for executing image processing according to distortion correcting data to correct a non-uniform perceived resolution caused by image distortion correction with different magnification ratios in an image, thereby achieving a uniform perceived resolution over the image, the image processing apparatus comprising:
    an aperture-compensation-signal adder configured to add a variable-frequency-band aperture compensation signal to a mainline signal at a stage prior to the image distortion correction, the variable-frequency-band aperture compensation signal corresponding to a frequency band in which an aperture compensation signal is lost by the image distortion correction;
    a distortion-correcting-data-preparing circuit configured to calculate the distortion correcting data when a partial conversion of magnification ratio is applied to the image caused by the image distortion correction; and
    a step-valued aperture-compensation-gain adjusting unit configured to execute image processing on the image at a stage subsequent to the image distortion correction, using the aperture compensation signal generated on the basis of a step-valued aperture compensation gain calculated using the calculated distortion correcting data used in the image distortion correction,
    wherein:
    the aperture-compensation-signal adder is configured to calculate coefficients for shifting the frequency band of the aperture compensation signal on the basis of the distortion correcting data used in the image distortion correction, and
    the step-valued aperture-compensation-gain adjusting unit is configured to
        calculate the step-valued aperture compensation gain using the distortion correcting data used in the image distortion correction,
        multiply the step-valued aperture compensation gain by the aperture compensation signal generated from the image obtained through the image distortion correction, and
        add the aperture compensation signal multiplied by the step-valued aperture compensation gain to the mainline signal.

3. The method of claim 1, wherein the step of executing image processing on the image comprises:
    calculating the step-valued aperture compensation gain using the distortion correcting data used in the image distortion correction,
    multiplying the step-valued aperture compensation gain by the aperture compensation signal generated from the image obtained through the image distortion correction, and
    adding the aperture compensation signal multiplied by the step-valued aperture compensation gain to the mainline signal.

* * * * *